United States Patent
Shen

(10) Patent No.: US 10,951,623 B2
(45) Date of Patent: Mar. 16, 2021

(54) SMART REMOTE CONTROL SYSTEM

(71) Applicant: NETVOX TECHNOLOGY CO., LTD., Tainan (TW)

(72) Inventor: Shiu-Cheng Shen, Tainan (TW)

(73) Assignee: NETVOX TECHNOLOGY CO., LTD., Tainan (TW)

( * ) Notice: Subject to any disclaimer, the term of this patent is extended or adjusted under 35 U.S.C. 154(b) by 438 days.

(21) Appl. No.: 16/120,820

(22) Filed: Sep. 4, 2018

(65) Prior Publication Data
US 2019/0319960 A1      Oct. 17, 2019

(30) Foreign Application Priority Data
Apr. 17, 2018   (TW) .................................. 107113062

(51) Int. Cl.
*H04L 29/06*    (2006.01)
*G06F 16/27*    (2019.01)
*G05B 15/02*    (2006.01)

(52) U.S. Cl.
CPC ............ *H04L 63/102* (2013.01); *G06F 16/27* (2019.01); *H04L 63/0209* (2013.01); *G05B 15/02* (2013.01)

(58) Field of Classification Search
CPC ...... H04W 4/70; H04W 4/80; H04L 12/2816; H04L 63/08; H04L 63/0876; H04L 63/0884; G05B 15/02; G05B 19/042
See application file for complete search history.

(56) References Cited

U.S. PATENT DOCUMENTS

| | | | |
|---|---|---|---|
| 7,933,945 B2* | 4/2011 | Krzyzanowski | H04L 12/2805 709/200 |
| 8,078,688 B2* | 12/2011 | Ansari | G06F 16/68 709/217 |
| 10,075,334 B1* | 9/2018 | Kozura | H04L 12/2807 |
| 10,498,830 B2* | 12/2019 | Burd | G06Q 50/06 |
| 2016/0142509 A1 | 5/2016 | Shen | |

FOREIGN PATENT DOCUMENTS

| | | |
|---|---|---|
| CN | 106211152 A | 12/2016 |
| CN | 106506550 A | 3/2017 |
| TW | M499015 U | 4/2015 |

OTHER PUBLICATIONS

Taiwanese Search Report received for TW Patent Application No. 107113062, dated Nov. 17, 2018, 2 pages (1 pages of English Translation and 1 pages of Original Document).

* cited by examiner

*Primary Examiner* — Michael R Vaughan
*Assistant Examiner* — Richard A McCoy
(74) *Attorney, Agent, or Firm* — Womble Bond Dickinson (US) LLP

(57) ABSTRACT

A smart remote control system comprises a plurality of gateway devices and a central management device. The central management device includes an authority management module configured to be operable to select a registered account, to establish a management authority over one of the gateway devices for the selected account, and to generate a bar code corresponding to both of the selected account and the management authority. The bar code may be displayed on an electronic device and scanned by another electronic device for validation of the management authority.

11 Claims, 2 Drawing Sheets

SMART REMOTE CONTROL SYSTEM

CROSS-REFERENCE TO RELATED APPLICATION

This application claims priority of Taiwanese Invention Patent Application No. 107113062, filed on Apr. 17, 2018.

FIELD

The disclosure relates to a smart remote control system, and more particularly to a smart remote control system capable of monitoring and controlling a plurality of appliances disposed at multiple locations.

BACKGROUND

Conventional Internet of Things (IoT) devices can be monitored remotely. However, when remote monitoring of multiple IoT devices deployed at different locations is desired, certain time-consuming operation is inevitable for a user to switch from monitoring or controlling device(s) deployed at one location to monitoring or controlling device(s) deployed at a different location, which is inconvenient.

For example, an application of IoT is smart home systems. A conventional smart home system is capable of being monitored and controlled through a cloud service. When a user intends to monitor multiple smart home systems deployed at different locations, e.g., in different cities, the user has to use either a different account or a different communication gateway for each system to monitor or control the system. In this situation, when something happens to a smart home system and the system issues an alert message while the user is monitoring another system, the user must, before being able to take appropriate action in response to the alert message, spend time on switching to another account or another communication gateway, and thus may miss the best time to react, which may lead to serious loss.

Therefore, a remote control system capable of effectively monitoring and controlling multiple sets of IoT devices (e.g., multiple smart home systems) that are deployed at different locations is desired. Further, since a set of IoT devices may possibly be supervised by multiple users, effective authority management of the users should be considered.

SUMMARY

Therefore, an object of the disclosure is to provide a smart remote control system that can alleviate at least one of the drawbacks of the prior art.

According to the disclosure, the smart remote control system includes a smart remote control system which includes a plurality of gateway devices, each of which is configured to be coupled to at least one appliance, and a central management device which is configured to communicate with the gateway devices, and to store plural pieces of account data and plural pieces of administrator authority data that have been linked to at least some of the pieces of account data, and that are respectively associated with the gateway devices. Each of the pieces of administrator authority data specifies authority given to an account associated with a linked one of the pieces of account data regarding access to the at least one appliance coupled to the respective one of the gateway devices. The central management device includes an authority management module configured to be accessible by an electronic device after a registered account corresponding to one of the pieces of account data that is linked to one of the pieces of administrator authority data has logged in to the central management device via the electronic device. The authority management module includes a user addition unit configured to be operable to select another one of the pieces of account data when the registered account is logged in to said central management device, an authority creation unit, and an authority linking unit. The authority creation unit is configured to, in response to selection of the another one of the pieces of account data, create for the another one of the pieces of account data a piece of user authority data that specifies authority, which is given to another registered account associated with the another one of the pieces of account data regarding access to the at least one appliance coupled to one of the gateway devices that is associated with the one of the pieces of account data and which is different from the authority specified by the pieces of administrator authority data, and generate a bar code to be provided to the electronic device for display thereby. The authority linking unit is configured to, when being accessed by another electronic device after the another electronic device scans the bar code and the another registered account corresponding to the another one of the pieces of account data has logged in to the central management device via the another electronic device, link the piece of user authority data with the another one of the pieces of account data. The central management device further includes an account management module configured to send the another one of the pieces of account data and the piece of user authority data to the one of the gateway devices for storage therein.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
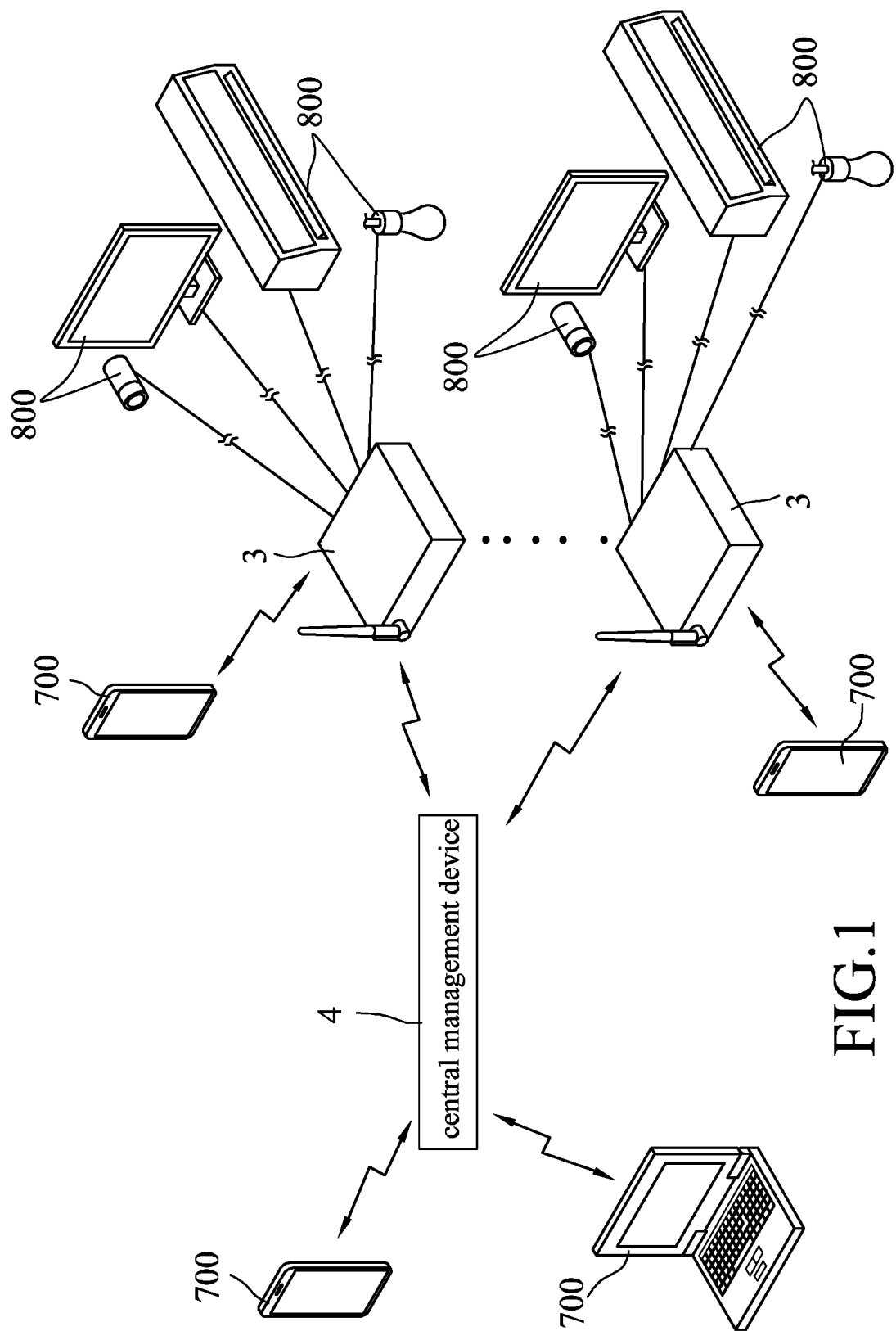
FIG. 1 is a schematic diagram of an exemplary smart remote control system according to an embodiment of the invention.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
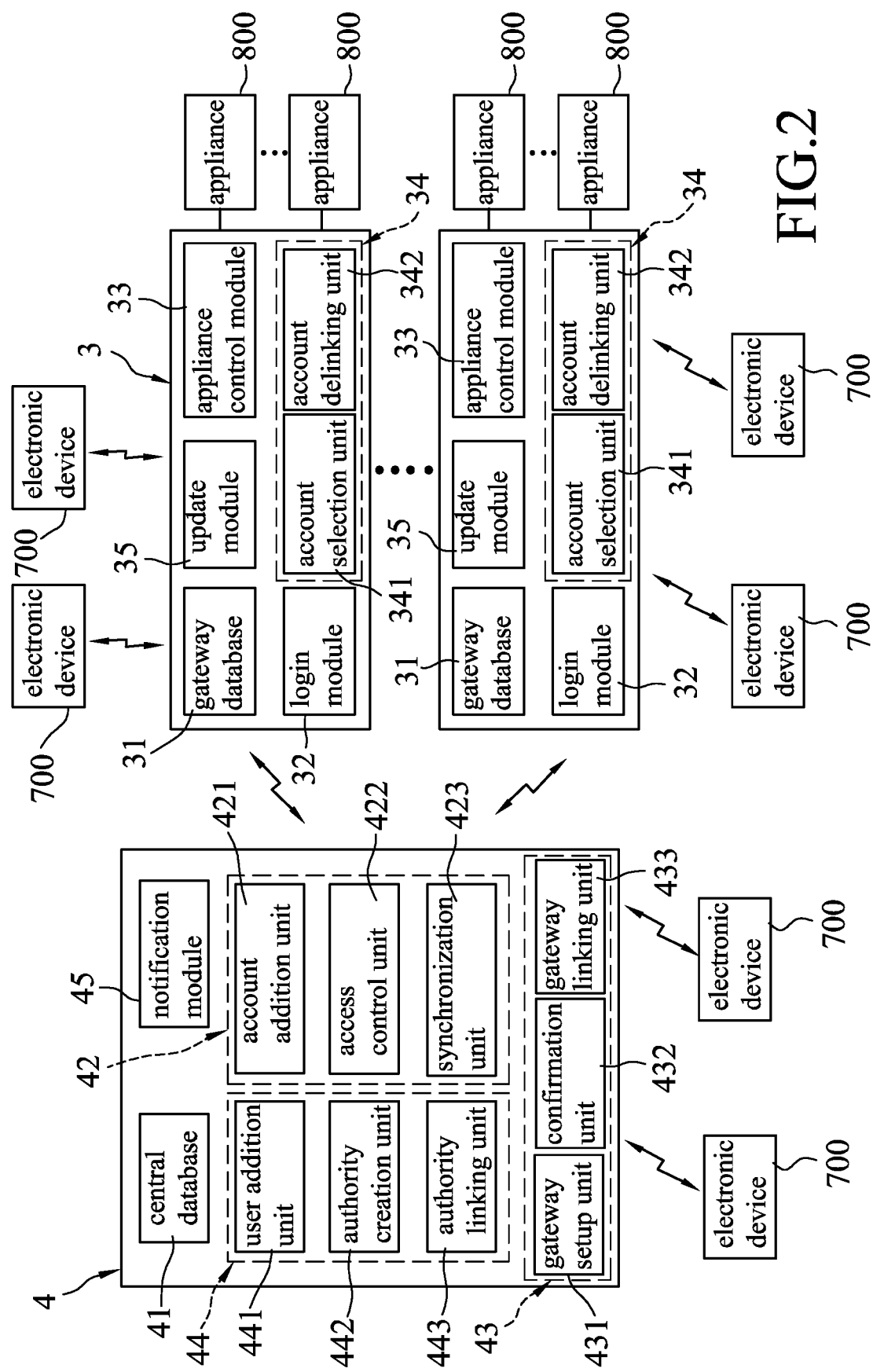
FIG. 2 is a block diagram of the exemplary smart remote control system according to an embodiment of the invention.

Referring to FIGS. 1 and 2, according to an embodiment, an exemplary smart remote control system is coupled to a plurality of appliances 800 disposed at multiple locations, and allows multiple electronic devices 700 to monitor and/or control these appliances 800 through network connection. The appliances 800 may include but are not limited to, for example, air conditioning equipments, multimedia equipments, lighting equipments and access control equipments. The appliances 800 are disposed at separate locations in groups. For example, a first group of appliances 800 may be disposed in a house in Beijing, a second group of appliances 800 may be disposed in another house in Taipei, and a third group of appliances 800 may be disposed in yet another house in New York. The electronic devices 700 may include but not be limited to, for example, mobile devices such as mobile phones, tablets, smart glasses, smart watches and smart wristbands, and computer devices such as notebooks and desktop computers.

According to an embodiment, the exemplary smart remote control system includes a central management device 4 and multiple gateway devices 3 which are respectively disposed at different locations. The central management device 4 is connected to each gateway device 3 through wired and/or wireless communication technologies, including but not limited to, for example, wireless network technology and mobile communication network technology. The gateway devices 3 and the central management device 4 are operable to communicate with an electronic device 700, which is operable by a user to log in to the gateway devices 3 and/or the central management device 4 to monitor and/or control the appliances 800.

Since the gateway devices 3 are configured and function in similar ways, the following description will focus on one of the gateway devices 3.

According to an embodiment, the gateway device 3 includes a gateway database 31, a login module 32, an appliance control module 33, a delinking module 34 and an update module 35.

The gateway database 31 is configured to store plural pieces of account data and plural pieces of management authority data which have been linked to the pieces of account data, respectively. Each of the plural pieces of management authority data is a piece of administrator authority data or a piece of user authority data that specifies management authority given to an account associated with the respective piece of account data regarding access to at least one appliance 800 coupled with the gateway device 3. The plural pieces of management authority data include one piece of administrator authority data and plural pieces of user authority data. The authority specified by the piece of administrator authority data is different from the authority specified by the pieces of user authority data. The login module 32 is configured to, when receiving a request from an electronic device 700 to log in to the gateway device 3, determine whether account information containing an alleged account received from the electronic device 700 matches any of the piece(s) of account data stored in the gateway database 31 through, for example, a comparison process. If so, the alleged account is allowed to log in to the gateway device 3, and the appliance control module 33 and the delinking module 34 are accessible to the electronic device 700. If not, the update module 35 communicates with the central management device 4 to update the piece(s) of account data stored in the gateway database 31, and then the login module 32 determines whether the account information received from the electronic device 700 matches any of the updated piece(s) of account data stored in the gateway database 31. If so, the alleged account is allowed to log in to the gateway device 3. If not, the request for log-in is denied. Said update operation will be discussed in further detail below.

The appliance control module 33 is configured to communicate with the appliance(s) 800 coupled to the gateway device 3. The appliance control module 33 receives appliance information of the appliance(s) 800 for storage therein. The appliance control module 33 also receives, from the appliance(s) 800, operation state messages related to operation states of the appliance(s) 800, and sends the operation state messages to the central management device 4. When a registered account which corresponds to one of the piece(s) of account data stored in the gateway database 31 has logged in to the gateway device 3 via an electronic device 700, the appliance control module 33 may retrieve, from the gateway database 31, a piece of management authority data which is linked with the piece of account data corresponding to the registered account that has logged in, in order to control a degree of access to the appliance(s) 800 coupled to the gateway device 3 the electronic device 700 is allowed according to the piece of management authority data. When the appliance control module 33 fails to retrieve the piece of management authority data from the gateway database 31, the update module 35 may communicate with the central management device 4 in an attempt to update the gateway database 31 to include the piece of management authority data, and then the appliance control module 33 may attempt to retrieve again the piece of management authority data from the gateway database 31. If the appliance control module 33 still fails to retrieve the piece of management authority data from the gateway database 31, the login module 32 may force the registered account to log out from the gateway device 3, and delete the piece of account data corresponding to the registered account from the gateway database 31. Said update operation will be discussed in further detail below.

According to an embodiment, the delinking module 34 has a user deletion mode and an administrator substitution mode, and includes an account selection unit 341 and an account delinking unit 342. When a registered account that corresponds to a piece of account data stored in the gateway database 31 has logged in to the gateway device 3 via an electronic device 700, the delinking module 34 is operable to enter the user deletion mode or the administrator substitution mode, wherein the administrator substitution mode can only be activated when the piece of account data stored in the gateway database 31 that corresponds to the registered account is linked with a piece of administrator authority data stored in the gateway database 31.

In the user deletion mode, when the piece of account data stored in the gateway database 31 that corresponds to the registered account having logged in is linked with a piece of administrator authority data stored in the gateway database 31, the account selection unit 341 is operable to list, on the electronic device 700, information about the piece(s) of account data stored in the gateway database 31, each of which is linked with a piece of user authority data stored in the gateway database 31, and is operable to select one of the piece(s) of account data. After one of the piece(s) of account data thus listed is selected through the account selection unit 341 (referred to as a selected piece of account data), the account delinking unit 342 is operable to delink the selected piece of account data from the piece of user authority data which is previously linked therewith, delete the selected piece of account data and the delinked piece of user authority data from the gateway database 31, and generate a user deletion signal corresponding to the selected piece of account data and the delinked piece of user authority data. On the other hand, when the piece of account data stored in the gateway database 31 that corresponds to the registered account having logged in has been linked with a piece of user authority data stored in the gateway database 31, said information about the piece(s) of account data stored in the gateway database 31, each of which is linked with a piece of user authority data stored in the gateway database 31, would not be listed on the electronic device 700. In this situation, the account delinking unit 342 is only operable to delink the piece of account data corresponding to the registered account having logged in from the piece of user authority data which is previously linked therewith, to delete the piece of account data corresponding to the registered account and the delinked piece of user authority data from the gateway database 31, and to generate the user deletion signal corresponding to the delinked pieces of account and user authority data.

In the administrator substitution mode which can only be activated when the piece of account data stored in the gateway database 31 that corresponds to the registered account having logged in is linked with a piece of administrator authority data stored in the gateway database 31, the account selection unit 341 is operable to show, on the electronic device 700, information about the registered account and information about the piece(s) of account data stored in the gateway database 31, each being linked with a piece of user authority data stored in the gateway database 31, and is operable to select one of the piece(s) of account data. After one of the piece(s) of account data is selected through the account selection unit 341, the account delinking unit 342 is operable to delink the piece of account data corresponding to the registered account from the piece of administrator authority data, de link the selected piece of account data from the piece of user authority data which is previously linked therewith, link the selected piece of account data with the piece of administrator authority data, delete the piece of account data corresponding to the registered account and the delinked piece of user authority data from the gateway database 31, and generate an administrator substitution signal accordingly.

Upon generation of the user deletion signal or the administrator substitution signal, the update module 35 is triggered to send the user deletion signal or the administrator substitution signal to the central management device 4, so that the central management device 4 may manage account data and management authority data stored therein to be consistent with those stored in the gateway device 3. For example, the central management device 4 may delink corresponding pieces of account and user authority data according to the user deletion signal after receipt thereof. As another example, the central management device 4 may link a piece of administrator authority data with a piece of account data in place of the piece of account data that is previously linked to the piece of administrator authority data according to the administrator substitution signal thus received. The operations of the central management device 4 after receiving the user deletion signal or the administrator substitution signal will be discussed in further detail below.

According to an embodiment, the central management device 4 includes a central database 41, an account management module 42, a gateway addition module 43, an authority management module 44 and a notification module 45.

The central database 41 is configured to store plural pieces of account data, plural pieces of management authority data and plural pieces of gateway identity data, wherein each of the pieces of management authority data is linked with one of the pieces of account data and is associated with one of the gateway devices 3, and wherein the plural pieces of gateway identity data correspond to the gateway devices 3, respectively. According to an embodiment, apiece of gateway identity data includes but is not limited to, for example, information for identifying a corresponding gateway device 3, Internet Protocol (IP) information of the corresponding gateway device 3, information about a communication gateway and a password for connecting the corresponding gateway device 3.

According to an embodiment, the account management module 42 includes an account addition unit 421, an access control unit 422 and a synchronization unit 423.

The account addition unit 421 is configured to communicate with an electronic device 700, and is operable by the electronic device 700 to register a new account, i.e., to create and store a piece of account data in the central database 41, according to account information inputted by the electronic device 700. According to an embodiment, the account information may include but is not limited to, for example, a name, a password and user information.

The access control unit 422 is configured to, upon receipt of a request from an electronic device 700 to log in to the central management device 4, determine whether the account information containing an alleged account received from the electronic device 700 matches any of the piece(s) of account data stored in the central database 41 through a comparison process. If it is determined that the account information matches one of the piece(s) of account data stored in the central database 41, the alleged account is allowed to log in to the central management device 4, and the gateway addition module 43 and the authority management module 44 are accessible to the electronic device 700. The access control unit 422 may then show, on the electronic device 700 for selection, one or more connection paths to each gateway device 3 corresponding to the alleged account and associated with the matched piece of account data. By selecting one of the connection path(s), the alleged account may log in to one of the gateway devices 3 corresponding to the connection path thus selected at the same time, and may access and operate the gateway device 3 via the electronic device 700.

The synchronization unit 423 is configured to, in response to receipt of an update request from a gateway device 3, send a copy of all of the pieces of account data and management authority data stored in the central database 41 that correspond to the gateway device 3 to the gateway database 31 of the gateway device 3 for storage therein. The synchronization unit 423 is also configured to, in response to receipt of the user deletion signal from a gateway device 3, delink a corresponding piece of account data stored in the central database 41 and a corresponding piece of user authority data stored in the central database 41 according to the user deletion signal, and delete the delinked piece of user authority data from the central database 41. The synchronization unit 423 is also configured to, in response to receipt of the administrator substitution signal from a gateway device 3, delink a first corresponding piece of account data stored in the central database 41 and a corresponding piece of administrator authority data stored in the central database 41 according to the administrator substitution signal, delink a second corresponding piece of account data stored in the central database 41 and a corresponding piece of user authority data stored in the central database 41 according to the administrator substitution signal, link the second corresponding piece of account data with the piece of administrator authority data, and delete the delinked piece of user authority data from the central database 41.

According to an embodiment, the gateway addition module 43 includes a gateway setup unit 431, a confirmation unit 432 and a gateway linking unit 433.

The gateway setup unit 431 is configured to be accessible by an electronic device 700, via which a registered account corresponding to one of the piece(s) of account data has logged in to the central management device 4, to input gateway information of a gateway device 3 which is supposed to be, but has not yet been associated with any of the piece(s) of account data stored in the central database 41. According to an embodiment, the gateway information includes but is not limited to, for example, information for identifying the gateway device 3, IP information of the gateway device 3, information about a communication gateway and a password for connecting the gateway device 3. The gateway setup unit 431 is configured to determine whether the gateway device 3 indicated by the received gateway information is associated with any of the piece(s) of account data stored in the central database 41 based on the pieces of gateway identity data stored in the central database 41. When it is determined that the gateway device 3 is not associated with any of the piece(s) of account data stored in the central database 41, the confirmation unit 432 may be activated to attempt to connect and communicate with the gateway device 3 according to the gateway information. After the confirmation unit 432 successfully connects the gateway device 3, the gateway linking unit 433 may be activated to create a piece of administrator authority data for the gateway device 3, store a piece of gateway identity data corresponding to the gateway information in the central database 41, and link the piece of administrator authority data thus created with both of said one of the piece(s) of account data corresponding to the registered account having logged in and the piece of gateway identity data. Also, the synchronization unit 423 may be activated to send a copy of said one of the piece(s) of account data and a copy of the piece of administrator authority data to the gateway database 31 of the gateway device 3 for storage therein. In one embodiment, the gateway linking unit 433 is designed to directly create a piece of administrator authority data for the gateway device 3 that is sought to be associated with whichever of the piece(s) of account data, but other embodiments are not limited thereto.

According to an embodiment, the authority management module 44 includes a user addition unit 441, an authority creation unit 442 and an authority linking unit 443.

The user addition unit 441 is accessible and operable by an electronic device 700, via which a registered account which corresponds to a piece of administrator authority data associated with a gateway device 3 has logged in to the central management device 4, to pick out each piece of account data stored in the central database 41 that is not associated with the gateway device 3, and to select one of the piece(s) of account data thus picked out for adding a new user for the gateway device 3 using the piece of account data thus selected.

The authority creation unit 442 is operable to create a piece of user authority data corresponding to both of the gateway device 3 and the piece of account data selected by the user addition unit 441 (referred to as a selected piece of account data), and to generate a bar code corresponding to the selected piece of account data and the piece of user authority data thus created.

According to an embodiment, the bar code may be, for example, a QR code. The bar code may then be provided to the electronic device 700 for display thereby for another one of the electronic devices 700, via which another registered account can log in to the central management device 4, to scan.

The authority linking unit 443 is accessible by the another electronic device 700 through scanning the bar code. The authority linking unit 443 is configured to, when being accessed by the another electronic device 700, determine whether the another registered account corresponds to the selected piece of account data indicated by the scanned bar code. When it is determined that the another registered account corresponds to the selected piece of account data, the authority linking unit 443 may store the piece of user authority data created by the authority creation unit 442 in the central database 41, and link the piece of user authority data with both of the selected piece of account data and the piece of gateway identity data of the gateway device 3 that are stored in the central database 41. Also, the synchronization unit 423 may be activated to send a copy of the selected piece of account data and a copy of the piece of user authority data to the gateway database 31 of the gateway device 3 for storage therein.

The notification module 45 is configured to receive and process operation state messages from all of the gateway devices 3. The notification module 45 is configured to, upon receiving an operation state me s sage which is related to one of appliance(s) 800 coupled to a gateway device 3 from the gateway device 3, pick out from the central database 41 every piece of management authority data that is associated with the gateway device 3 and that permits control and/or monitoring of the appliance 800, and every piece of account data linked with the piece(s) of management authority data thus picked out. Once a registered account corresponding to one of the piece(s) of account data thus picked out logs in to the central management device 4 via an electronic device 700, the notification module 45 may push the operation state me s sage to the electronic device 700 for the user of the electronic device 700 to be aware of the operation state of the appliance 800.

According to an embodiment, each user of the disclosed smart remote control system has to register an account through communication with the central management device 4 before the user can remotely control the appliance(s) 800 coupled to any of the gateway devices 3 of the system.

According to an embodiment, a user may become an administrative user of a gateway device 3 by: coupling at least one appliance 800 to be monitored to the gateway device 3; connecting the gateway device 3 with the central management device 4 for communication therewith; operating the gateway addition module 43 of the central management device 4 to create a piece of administrator authority data corresponding to both of the gateway device 3 and a registered account of the user, and link the piece of administrator authority data thus created with both of a piece of account data corresponding to the registered account and a piece of gateway identity data of the gateway device 3; and storing the piece of administrator authority data in both of the central database 41 of the central management device 4 and the gateway database 31 of the gateway device 3 through the account management module 42.

According to an embodiment, an administrative user of a gateway device 3 may add multiple regular users for the gateway device 3 and, for each of the regular users, assign customized authority over the appliance(s) 800 coupled to the gateway device 3 to the regular user.

According to an embodiment, an administrative user of a gateway device 3 may add a regular user for the gateway device 3 by operating the authority management module 44 of the central management device 4 to select a piece of account data corresponding to a registered account of the regular user desired to be added, create a piece of user authority data corresponding to the selected piece of account data that specifies management authority to be given to the registered account of the regular user in the aspects of monitoring and/or control of appliance(s) 800 coupled to the gateway device 3, and generate a bar code to be displayed on an electronic device 700 used by the administrative user of the gateway device 3 to log in to the central management device 4. The regular user may access the authority management module 44 by scanning the bar code with another electronic device 700, via which the registered account of the regular user can log in to the central management device 4. Once the authority management module 44 has confirmed that the registered account used by the another electronic device 700 matches the selected piece of account data indicated by the scanned bar code, the authority management module 44 may link the selected piece of account data and the piece of user authority data thus created and associate the selected piece of account data with the gateway device 3. The account management module 42 may then send a copy of the selected piece of account data and the piece of user authority data to the gateway device 3 for storage therein.

According to an embodiment, upon receiving, from a gateway device 3 which is associated with multiple users (including one administrative user and multiple regular users), an operation state message related to an appliance 800 coupled to the gateway device 3, the central management device 4 may identify each piece of management authority data that is associated with the gateway device 3 and that permits control and/or monitoring of the appliance 800, and for each piece of management authority data thus identified, a piece of account data linked with the piece of management authority data thus identified. Then, when a registered account corresponding to one of said piece(s) of account data is logged in to the central management device 4 via an electronic device 700, the central management device 4 may send the operation state message to the electronic device 700.

According to an embodiment, any operation state message issued by any appliance 800 coupled to any of the gateway devices 3 is submitted to the central management device 4 by the corresponding gateway device 3, and then sent to user(s) with corresponding registered account(s) having management authority over the appliance 800. In this way, when a user supervises multiple gateway devices 3, the user does not have to log in to these gateway devices 3 separately to check the operation states of the appliances 800 subjected to control of these gateway devices 3. Instead, the user may receive all relevant operation state messages and conveniently monitor and/or control all of the appliances 800 subjected to control of these gateway devices 3 using a single login of a single registered account to the central management device 4.

According to an embodiment, when a user is no longer to be a user of a gateway device 3, the delinking module 34 may be activated to disassociate the account of the user from the gateway device 3.

According to an embodiment, a user which is a regular user of a gateway device 3 may log in to the gateway device 3 via an electronic device 700 and activate the user deletion mode of the delinking module 34 through the electronic device 700 to disassociate the account of the user from the gateway device 3. Specifically, the user may activate the user deletion mode of the delinking module 34 to delink the piece of account data stored in the gateway database 31 of the gateway device 3 which corresponds to the account of the user that has logged in from the piece of user authority data stored in the gateway database 31 which is previously linked to the piece of account data. After the pieces of account data and user authority data have been delinked, the delinking module 34 may delete the delinked pieces of account and user authority data from the gateway database 31, and the update module 35 may send a user deletion signal to the central management device 4 in order for the account management module 42 of the central management device 4 to similarly delete the piece of user authority data from the central database 41 so that the piece of account data corresponding to the user is disassociated from the gateway device 3.

According to an embodiment, a user which is an administrative user of a gateway device 3 may log in to the gateway device 3 via an electronic device 700 and activate the user deletion mode or the administrator substitution mode of the delinking module 34 through the electronic device 700 to disassociate, from the gateway device 3, the account of one of the regular user(s) of the gateway device 3 or the account of the administrative user. Specifically, the user may activate the user deletion mode of the delinking module 34 to select a piece of account data stored in the gateway database 31 of the gateway device 3 which corresponds to one of the regular user(s), and to delink the piece of account data from the piece of user authority data stored in the gateway database 31 which is previously linked to the piece of account data, in order to disassociate the supervisor from the gateway device 3. On the other hand, the user may activate the administrator substitution mode of the delinking module 34 to select a piece of account data stored in the gateway database 31 of the gateway device 3 which corresponds to one of the regular user(s) that is designated to take over the administrator authority of the gateway device 3. The delinking module 34 may, in response to the selection, link the piece of administrator authority data stored in the gateway database 31 with the selected piece of account data instead of the piece of account data corresponding to the account of the user that has logged in, delete the piece of account data corresponding to the account of the user that has logged in and the piece of user authority data which is previously linked to the selected piece of account data from the gateway database 31, and accordingly generate an administrator substitution signal which is to be sent to the central management device 4 for the central management device 4 to manage the account data and the management authority data stored in the central database 41 in away similar to the gateway device 3 according to the administrator substitution signal.

According to an embodiment, in a scenario that a user operates an electronic device 700 to directly connect a gateway device 3 in order to log in to the gateway device 3, when the gateway device 3 determines that the account information containing an alleged account received from the electronic device 700 is invalid, the gateway device 3 may communicate with the central management device 4 to update the piece(s) of account data stored in the gateway database 31 of the gateway device 3, and then determine whether the account information received from the electronic device 700 is valid according to the updated piece(s) of account data stored in the gateway database 31. If so, the alleged account is allowed to log in to the gateway device 3 via the electronic device 700.

According to an embodiment, when a registered account which corresponds to one of the piece(s) of account data stored in a gateway database 31 of a gateway device 3 has logged in to the gateway device 3 via an electronic device 700, and when it is determined that a piece of management authority data linked with the piece of account data is not retrievable from the gateway database 31, the data stored in the gateway database 31 is determined to be not synchronized with the data stored in the central database 41. In this situation, the gateway device 3 may communicate with the central management device 4 to synchronize data related to authority between the gateway database 31 and the central database 41, and then determine if the piece of management authority data linked with the piece of account data is retrievable from the gateway database 31. If it is determined that the piece of management authority data is retrievable from the gateway database 31, the electronic device 700 is allowed to be used to monitor and/or control the appliance(s) 800 coupled to the gateway device 3 according to the piece of management authority data. If it is determined that the piece of management authority data is still not retrievable from the gateway database 31, which means that the registered account that has logged in should no longer be associated with the gateway device 3, the registered account would be forced to log out from the gateway device 3, and the piece of account data corresponding to this account would be deleted from the gateway database 31.

The above synchronization/update operations allow for correction of login failure occurred when the account data and the management authority data stored in the gateway database 31 and the central database 41 are not synchronized. Such non-synchronization may be caused by, for example, Internet disconnections that occur during the process of the central management device 4 transmitting account data and/or the management authority data to the gateway devices 3 for storage therein.

Since each account is registered through the central management device 4, and since a piece of account data and a piece of management authority data that constitute a corresponding, linked pair are sent from the central management device 4 to a corresponding gateway device 3 when the pair is linked and associated with the gateway device 3 through operation of the central management device 4, so that relevant data stored in the gateway device 3 is brought into conformity with those stored in the central management device 4, one beneficial characteristic of the disclosed smart remote control system is that, a user only needs to register an account once through the central management device 4, in order to acquire management authority over multiple gateway devices 3 through operation of the central management device 4. That is, the disclosed smart remote control system simplifies the processes of account registration and management authority acquisition.

In addition, since any operation state message issued by any appliance 800 coupled to any of the gateway devices 3 is submitted to the central management device 4 by the gateway device 3 and then sent to user(s) with corresponding registered account(s) that has (have) management authority over the appliance 800, one beneficial characteristic of the disclosed smart remote control system is that, a user may receive all relevant operation state messages and conveniently monitor and/or control all of the appliances 800 under his/her supervision, despite the appliances 800 belonging to different gateway devices 3, with a single login of a single registered account to the central management device 4 instead of logging in to these gateway devices 3 separately. That is, the user may monitor and/or control the appliances 800 more efficiently.

Another beneficial characteristic of the disclosed smart remote control system is that, a regular user can be easily added for a gateway device 3, since the administrative user of the gateway device 3 may create management authority data for the new regular user and a corresponding bar code by logging in to and operating the central management device 4, and since the new regular user may simply acquire management authority over the gateway device 3 according to the created management authority data by scanning the bar code.

As described above, with the disclosed smart remote control system, a user that monitors multiple appliances 800 which are subjected to control of multiple gateway devices 3 disposed at different locations may receive all relevant operation state messages issued by the appliances 800 once the user has logged in to the central management device 4. In other words, the user may monitor all of the appliances 800 disposed at different locations at the same time. Further, with the disclosed smart remote control system, management authority of users over the gateway devices 3 and/or the appliances 800 of the system can be easily and efficiently controlled.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A smart remote control system, comprising:
   a plurality of gateway devices, each of which is configured to be coupled to at least one appliance; and
   a central management device which is configured to communicate with said gateway devices, and to store plural pieces of account data and plural pieces of administrator authority data that have been linked to at least some of the pieces of account data, and that are respectively associated with said gateway devices, each of the pieces of administrator authority data specifying authority given to an account associated with a linked one of the pieces of account data regarding access to the at least one appliance coupled to the respective one of said gateway devices, said central management device including a processor to execute:
   an authority management module configured to be accessible by an electronic device after a registered account corresponding to one of the pieces of account data that is linked to one of the pieces of administrator authority data has logged in to said central management device via the electronic device, said authority management module including
   a user addition unit configured to be operable to select another one of the pieces of account data when the registered account is logged in to said central management device;
   an authority creation unit configured to, in response to selection of said another one of the pieces of account data, create for said another one of the pieces of account data a piece of user authority data that specifies authority, which is given to another registered account associated with said another one of the pieces of account data regarding access to the at least one appliance coupled to one of said gateway devices that is associated with said one of the pieces of account data and which is different from the authority specified by the pieces of administrator authority data, and generate a bar code to be provided to the electronic device for display thereby; and an authority linking unit configured to, when being accessed by another electronic device after said another electronic device scans the bar code and said another registered account corresponding to said another one of the pieces of account data has logged in to said central management device via said another electronic device, link the piece of user authority data with said another one of the pieces of account data, and an account management module configured to send said another one of the pieces of account data and the piece of user authority data to said one of said gateway devices for storage therein;

wherein each of said gateway devices includes a gateway processor to execute:

a gateway database configured to store said one of the pieces of account data that is associated with said gateway device, and one of the piece of user authority data and the pieces of administrator authority data that has been linked to said one of the pieces of account data that is associated with said gateway device; and an appliance control module configured to, when a registered account corresponding to said one of the pieces of account data that is associated with said gateway device has logged in to said gateway device via an electronic device, control a degree of access to the at least one appliance coupled to said gateway device the electronic device is allowed according to said one of the piece of user authority data and the pieces of administrator authority data, and forward an operation state message received from the at least one appliance to said central management device, wherein said central management device further includes:

a central database configured to store the pieces of account data, the pieces of administrator authority data and the piece of user authority data; and said processor to execute a gateway addition module including a gateway linking unit, wherein said gateway linking unit is configured to, when activated, create, for said one of the pieces of account data that the registered account having logged in to said central management device corresponds to, a piece of administrator authority data that corresponds to said another gateway device, and link the piece of administrator authority data thus created with said one of the pieces of account data that the registered account having logged in to said central management device corresponds to and the piece of gateway identity data of said another gateway device, wherein said account management module of said central management device includes:

a synchronization unit for execution by said processor, said synchronization unit configured to, after said gateway linking unit links the piece of administrator authority data thus created with said one of the pieces of account data that the registered account having logged in to said central management device corresponds to and the piece of gateway identity data of said another gateway device, store the piece of administrator authority data thus created in said central database of said central management device and send the piece of administrator authority data thus created to said another gateway device for storage in said gateway database of said another gateway device, and after said authority linking unit links the piece of user authority data with said another one of the pieces of account data, store the piece of user authority data in said central database of said central management device and send the piece of user authority data to said one of said gateway devices for storage in said gateway database of said one of said gateway devices, wherein said appliance control module of each of said gateway devices is further configured to, when a registered account corresponding to said one of the pieces of account data stored in said gateway database of said gateway device has logged in to said gateway device via an electronic device, attempt to retrieve, from said gateway database, one of the piece of user authority data and the pieces of administrator authority data that is linked with said one of the pieces of account data the registered account corresponds to, when it is determined that said one of the piece of user authority data and the pieces of administrator authority data that is linked with said one of the pieces of account data the registered account corresponds to is not retrievable from said gateway database, enable an update module to communicate with said synchronization unit of said central management device, and to request said synchronization unit to attempt to synchronize data related to authority between said gateway database and said central database according to one of the piece of user authority data and the pieces of administrator authority data that is stored in said central database, that is linked to said one of the pieces of account data the registered account corresponds to and that is associated with said gateway device, and subsequently attempt to retrieve said one of the piece of user authority data and the pieces of administrator authority data from said gateway database, and wherein said appliance control module is further configured to, when the subsequent attempt to retrieve said one of the piece of user authority data and the pieces of administrator authority data from said gateway database fails, activate a login module to force the registered account to log out from said gateway device, and delete said one of the pieces of account data the registered account corresponds to from said gateway database.

2. The smart remote control system of claim 1, wherein each of said gateway devices is configured to, when a registered account corresponding to one of the pieces of account data that is associated with said gateway device and that is given authority to access the at least one appliance coupled to said gateway device has logged in to said gateway device via an electronic device, enable the electronic device to monitor and control the at least one appliance coupled to said gateway device according to the authority specified by one of the piece of user authority data and the pieces of administrator authority data that is linked to said one of the pieces of account data that is associated with said gateway device.

3. The smart remote control system of claim 1, wherein said central management device further includes a notification module configured to, in response to receipt of the operation state message from said gateway device, send the operation state message to each electronic device, via which a registered account corresponding to said one of the pieces of account data that is associated with said gateway device that has logged in to said central management device.

4. The smart remote control system of claim 3, wherein said central management device further includes: a gateway setup unit configured to be accessible by the electronic device, via which a registered account corresponding to said one of the pieces of account data that is associated with one of said gateway devices that has logged in to said central management device, to input a piece of gateway identity data of another gateway device which is not associated with any of the pieces of account data, and a confirmation unit configured to activate said gateway linking unit after connecting with said another gateway device according to the piece of gateway identity data input by the electronic device, wherein said account management module is further configured to send said one of the pieces of account data that the registered account having logged in to said central management device corresponds to and the piece of administrator authority data linked thereto to said another gateway device for storage in said another gateway device.

5. The smart remote control system of claim 4, wherein said account management module of said central management device includes: an account addition unit which is operable to create a piece of account data.

6. The smart remote control system of claim 5, wherein each of said gateway devices includes a login module and an update module, said login module being configured to,
when it is determined that information containing an alleged account received from an electronic device does not match any of the piece(s) of account data stored in said gateway database of said gateway device, enable said update module to communicate with said synchronization unit of said central management device, and to request said synchronization unit to update the piece(s) of account data stored in said gateway database to be consistent with the piece(s) of account data stored in said central database and associated with said gateway device, and subsequently determine whether said information containing the alleged account matches any of the piece(s) of account data stored in said gateway database.

7. The smart remote control system of claim 5, wherein each of said gateway devices further includes:
a delinking module configured to be accessible by an electronic device after a registered account corresponding to one of the pieces of account data that is associated with said gateway device has logged in to said gateway device via the electronic device, said delinking module including an account selection unit and an account delinking unit,
wherein when said delinking module is in a user deletion mode,
said account selection unit is operable to select, from said gateway database of said gateway device, another one of the pieces of account data that is linked to a piece of user authority data stored in said gateway database, and said account delinking unit is configured to, in response to selection of said another one of the pieces of account data that is linked to a piece of user authority data stored in said gateway database, delink the piece of user authority data from said another one of the pieces of account data that is linked to a piece of user authority data stored in said gateway database,
wherein when said one of the pieces of account data that the registered account having logged in to said gateway device corresponds to is linked to one of the pieces of administrator authority data that is associated with said gateway device and when said delinking module is in an administrator substitution mode,
said account selection unit is operable to select, from said gateway database, further another one of the pieces of account data that is linked to another piece of user authority data stored in said gateway database, and
said account delinking unit is configured to, in response to selection of said further another one of the pieces of account data, link said one of the pieces of administrator authority data to said further another one of the pieces of account data instead of said one of the pieces of account data that the registered account having logged into said gateway device corresponds to.

8. The smart remote control system of claim 7, wherein said account delinking unit is further configured to,
after delinking the piece of user authority data from said another one of the pieces of account data that was linked to a piece of user authority data stored in said gateway database, generate a user deletion signal, and
in response to linking said one of the pieces of administrator authority data to said further another one of the pieces of account data, generate an administrator substitution signal,
wherein each of said gateway devices further includes an update module configured to,
in response to generation of the user deletion signal, send the user deletion signal to said central management device, and
in response to generation of the administrator substitution signal, send the administrator substitution signal to said central management device,
wherein said synchronization unit of said central management device is further configured to,
in response to receipt of the user deletion signal, delink the piece of user authority data stored in said central database from said another one of the pieces of account data stored in said central database that was linked to a piece of user authority data stored in said gateway database, and
in response to receipt of the administrator substitution signal, link said one of the pieces of administrator authority data stored in said central database to said further another one of the pieces of account data stored in said central database instead of said one of the pieces of account data stored in said central database the registered account corresponds to.

9. The smart remote control system of claim 8, wherein said synchronization unit of said central management device is further configured to,
after delinking the piece of user authority data stored in said central database from said another one of the pieces of account data stored in said central database that was linked to a piece of user authority data stored in said gateway database, delete the piece of user authority data from said central database, and after linking said one of the pieces of administrator authority data stored in said central database to said further another one of the pieces of account data stored in said central database, delete the another piece of user authority data from said central database.

10. The smart remote control system of claim 7, wherein when said one of the pieces of account data that the registered account having logged in to said gateway device corresponds to is linked to the piece of user authority data stored in said gateway database, said another one of the pieces of account data selected by said account selection unit is said one of the pieces of account data that the registered account having logged in to said gateway device corresponds to.

11. The smart remote control system of claim 7, wherein said account delinking unit is further configured to, after delinking the piece of user authority data from said another one of the pieces of account data that was linked to a piece of user authority data stored in said gateway database, delete said another one of the pieces of account data and the piece of user authority data from said gateway database; and after linking said one of the pieces of administrator authority data to said further another one of the pieces of account data, delete said one of the pieces of account data that the registered account having logged in to said gateway device corresponds to and the another piece of user authority data from said gateway database.

* * * * *